United States Patent

Ogasawara

[11] Patent Number: 5,521,898
[45] Date of Patent: May 28, 1996

[54] APPARATUS FOR INSERTION OF INFORMATION INTO EXISTING INFORMATION RECORD

[75] Inventor: Yoshimi Ogasawara, Yokohama, Japan

[73] Assignee: Canon Kabushiki Kaisha, Tokyo, Japan

[21] Appl. No.: 203,578

[22] Filed: Mar. 1, 1994

[30] Foreign Application Priority Data

Mar. 4, 1993 [JP] Japan ................................ 5-043938

[51] Int. Cl.⁶ .............................. H04N 5/782; G11B 7/00
[52] U.S. Cl. .............................. 369/124; 369/83; 369/84; 358/311; 360/32
[58] Field of Search ............................... 369/124, 83, 84; 348/384, 390, 416, 417, 397, 415, 418; 358/335, 311, 313; 360/32

[56] References Cited

U.S. PATENT DOCUMENTS

| | | | |
|---|---|---|---|
| 4,969,055 | 11/1990 | Oberjatzas, et al. | 360/32 |
| 5,293,229 | 3/1994 | Iu | 348/415 |
| 5,325,125 | 6/1994 | Naimpally et al. | 348/402 |

FOREIGN PATENT DOCUMENTS

| | | |
|---|---|---|
| 0396285 | 11/1990 | European Pat. Off. . |
| 0456433 | 11/1991 | European Pat. Off. . |
| 0561454 | 9/1993 | European Pat. Off. . |
| 2285816 | 11/1990 | Japan . |
| 4239280 | 8/1992 | Japan . |
| 5176297 | 7/1993 | Japan . |
| 5176296 | 7/1993 | Japan . |
| 8602516 | 4/1986 | WIPO . |

*Primary Examiner*—Georgia Y. Epps
*Assistant Examiner*—Kim-Kwok Chu
*Attorney, Agent, or Firm*—Fitzpatrick, Cella, Harper & Scinto

[57] ABSTRACT

A transmitting apparatus for inserting new information from a designated position of one channel and transmitting in a transmitting system for compressing a series of information signals by a non-prediction coding and a prediction coding which uses non-prediction coding information as reference information and for transmitting prediction coding information and the non-prediction coding information in accordance with a predetermined order, wherein the non-prediction coding information after an insertion point and the past information than the non-prediction coding information are preserved, and a first predetermined number of information in the information to be inserted is prediction coded by using the non-prediction coding information after the insertion point as reference information.

11 Claims, 9 Drawing Sheets

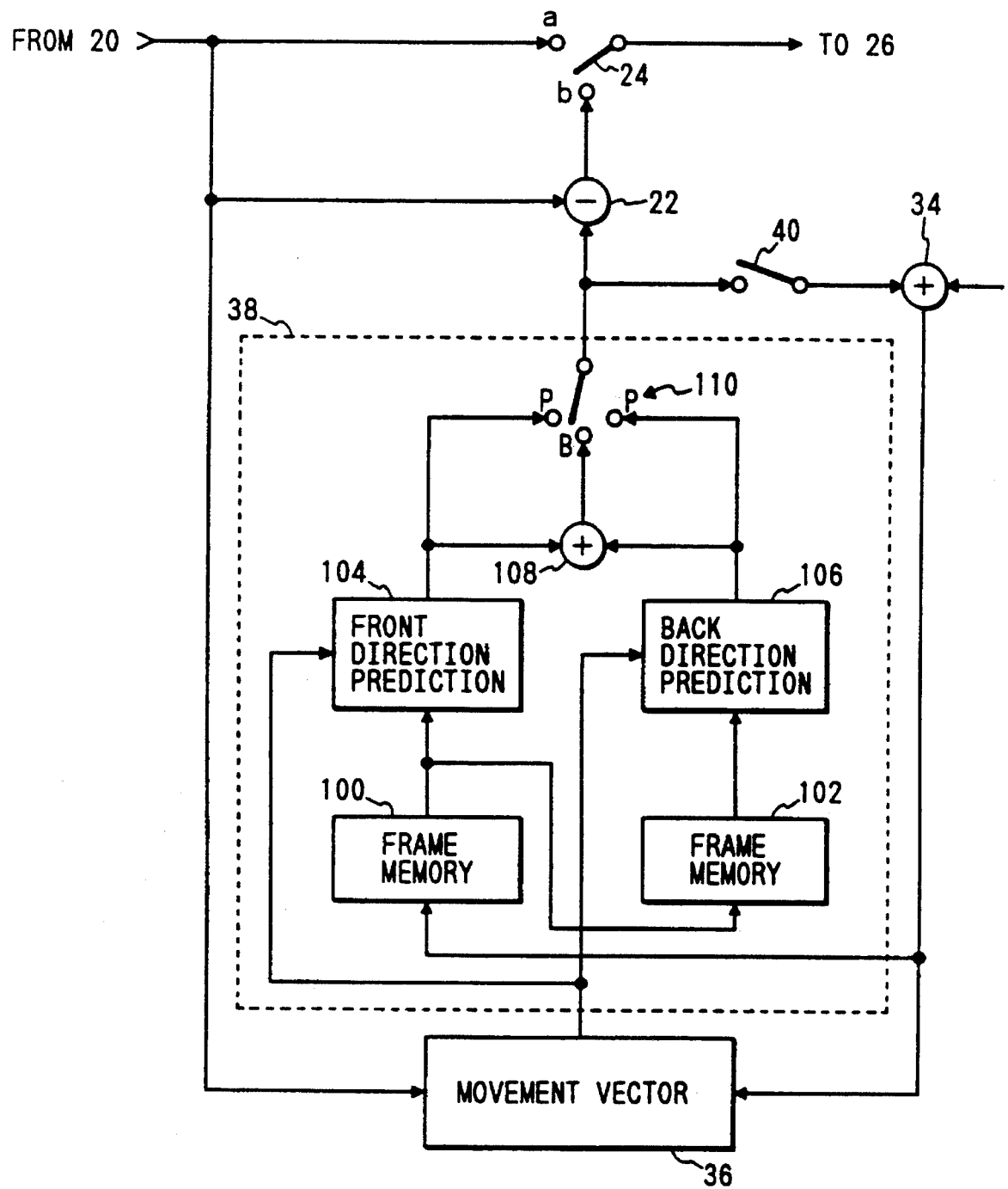

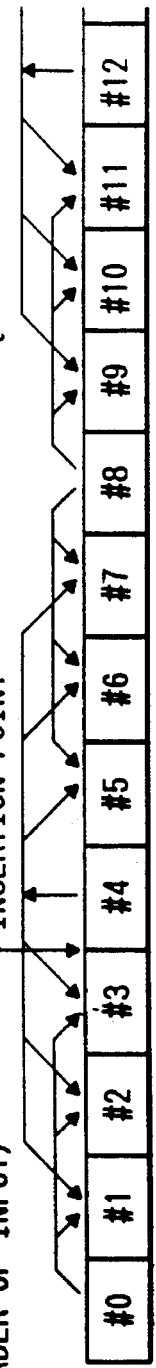
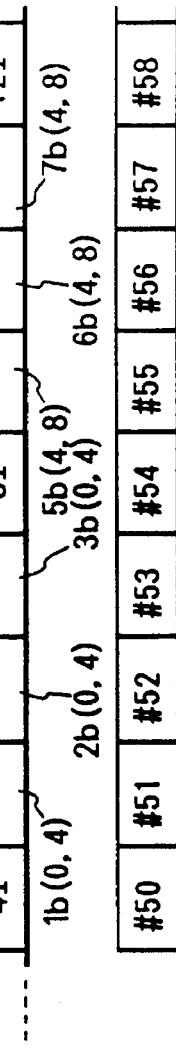
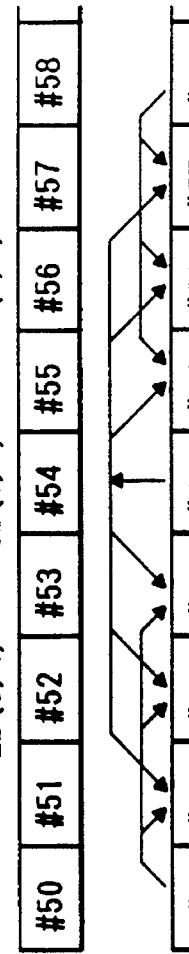
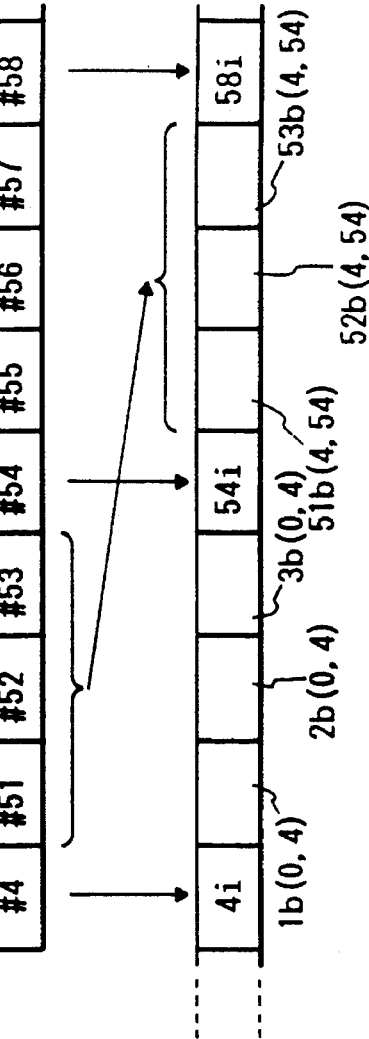
FIG. 5A SIGNAL TO BE INSERTION-EDITED (IN ORDER OF INPUT)
FIG. 5B SIGNAL TO BE INSERTION-EDITED (IN ORDER OF RECORDING)
FIG. 5C SIGNAL TO BE INSERTED (IN ORDER OF INPUT)
FIG. 5D CODING OF SIGNAL TO BE INSERTED
FIG. 5E SIGNAL AFTER INSERTION (IN ORDER OF RECORDING)

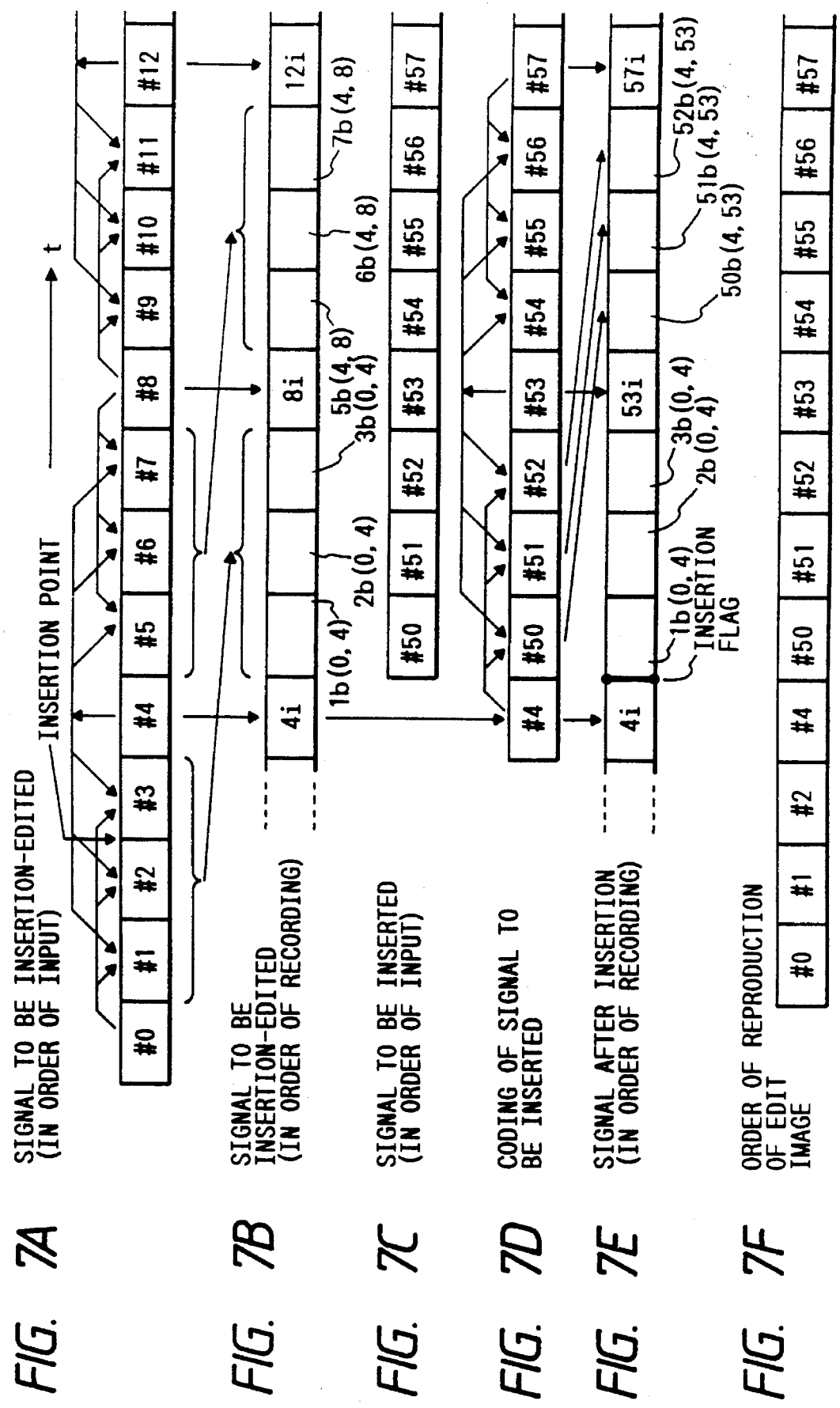

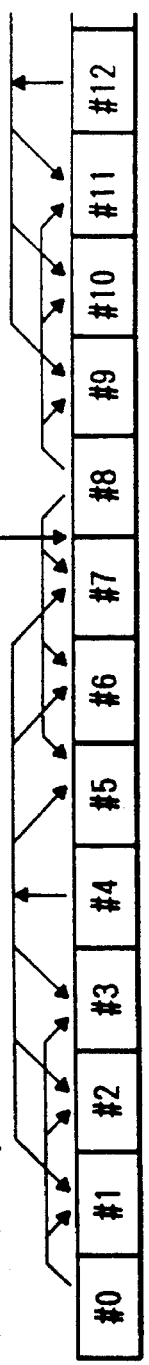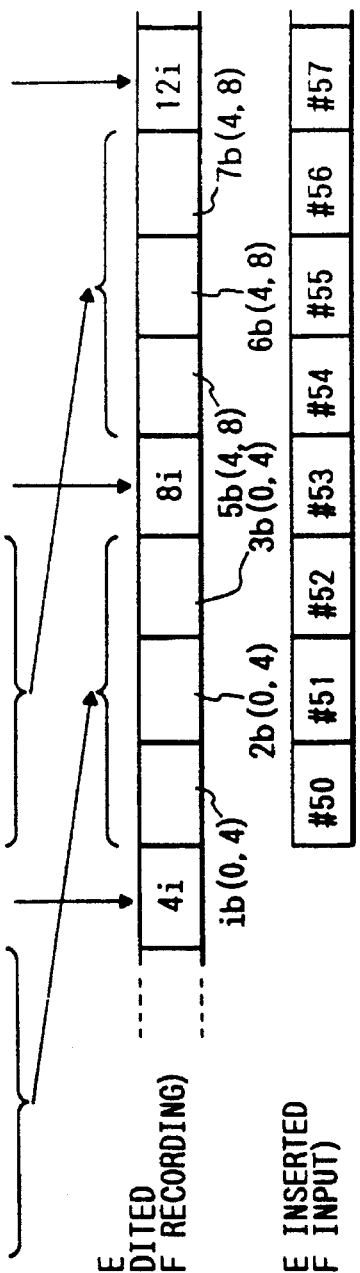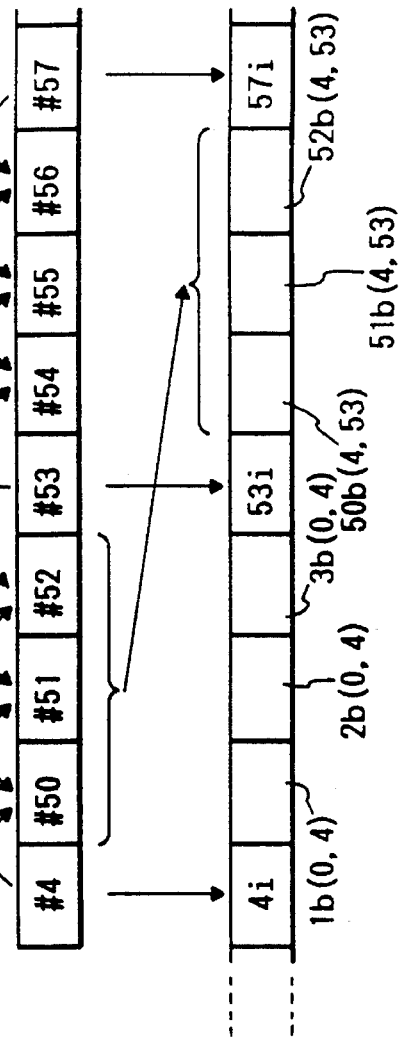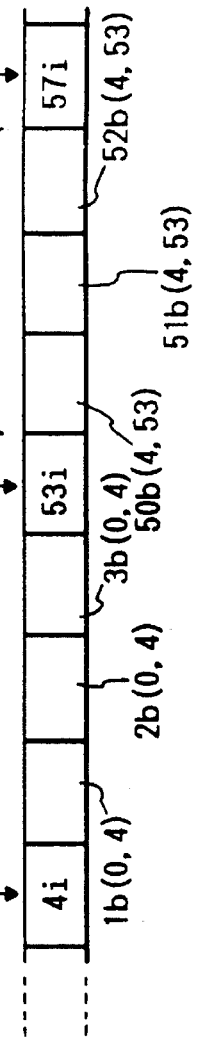

APPARATUS FOR INSERTION OF INFORMATION INTO EXISTING INFORMATION RECORD

BACKGROUND OF THE INVENTION

1. Field of the Invention

The present invention relates to a transmitting apparatus and, more particularly, to a transmitting apparatus in which information of another channel is inserted into information of one channel in a transmitting system for compressing information by a prediction coding and a non-prediction coding and transmitting the compressed information.

2. Related Background Art

A digital video tape recorder (VTR) is known as an image recording apparatus for digitally compressing a moving image and recording it onto a recording medium such as a magnetic tape or the like. There are a fixed length coding compression method and a variable length coding compression method as compression methods. As compared with the fixed length coding compression method, in the variable length coding compression method, although a high compression ratio of about 1/10 to 1/20 can be accomplished without largely deteriorating a picture quality, there is a drawback such that a compression data amount per picture plane (frame or field) is not uniform and it is difficult to perform the editing (joint recording or the like), retrieval, and special reproduction (random access, fast forward reproduction, reverse reproduction, etc.).

An MPEG (Moving Picture Coding Expert Group) method uses an intra-frame (field) coding and a prediction coding which uses a future and/or past frame (or field) as a reference picture plane and periodically arranges the intra-frame coded picture plane (hereinafter, called an I frame) and, on the other hand, sets the picture plane in the I frame to a prediction coded picture plane. According to such a recording method, the compression data of an inter-frame prediction coding picture plane in the reverse direction or both directions is recorded after the compression data of the prediction reference picture plane on the recording medium.

According to such a recording method, for instance, a limitation occurs at the joint position of the image, for instance, in the insertion recording (joint recording). For example, even if the operator tries to join another picture plane just after the inter-frame prediction coding picture plane in the reverse direction or both directions, the image data of the picture plane which is necessary to decode such an inter-frame prediction coding image in the reverse direction or both directions needs to be preserved on the recording medium. On the other hand, a prediction relation between the old picture plane to be inserted and the new picture plane to be inserted becomes discontinuous in the joint portion, so that a reproduction picture plane becomes disorder.

Such a problem is not limited to only the VTR as mentioned above but a similar problem also occurs in case of inserting data of another channel to a predetermined insertion point of data of one channel.

SUMMARY OF THE INVENTION

It is an object of the present invention to provide a transmitting apparatus which can solve such inconveniences as mentioned above.

According to the invention, there is provided a transmitting apparatus for inserting new information from a designated position of one channel in a transmitting system for compressing a series of information signals by a non-prediction coding and a prediction coding using non-prediction coding information as reference information and for transmitting the prediction coding information and the non-prediction coding information in accordance with a predetermined order, wherein the non-prediction coding information after the insertion point and the past information than such information are preserved, and a first predetermined number of information among information to be inserted are prediction coded by using the non-prediction coding information after the insertion point as reference information.

A transmitting apparatus according to the present invention is a recording apparatus such as a VTR or the like and is a recording apparatus for recording new information from the designated position of the existing record in a recording system for compressing a series of information signals by a non-prediction coding and a prediction coding using non-prediction coding information as reference information and for recording the prediction coding information and the non-prediction coding information onto a recording medium in accordance with a predetermined order, wherein the recorded information, namely, the past non-prediction coding information using the non-prediction coding information after the insertion point as reference information is erased, and a first predetermined number of information among information to be inserted are prediction-coded by using the non-prediction coding information before the insertion point of the recorded information as reference information.

By the above means, regularities of the prediction coding and the non-prediction coding can be maintained even by the insertion recording, and it is sufficient to execute the same reproducing process at time points before and after the insertion points. The invention can also easily cope with the edition, retrieval, special reproduction, or the like.

The above and other objects and features of the present invention will become apparent from the following detailed description and the appended claims with reference to the accompanying drawings.

BRIEF DESCRIPTION OF THE DRAWINGS

FIG. 2 is a schematic constructional block diagram of a movement compensation frame prediction circuit 38;

FIGS. 5A to 5E are timing charts for the first insertion recording in the embodiment;

FIGS. 7A to 7F are timing charts for the second insertion recording in the embodiment;

FIGS. 9A to 9E are timing charts for the third insertion recording in the embodiment.

DETAILED DESCRIPTION OF THE PREFERRED EMBODIMENT

An embodiment of the present invention will be described hereinbelow with reference to the drawings.

Figure 1A:
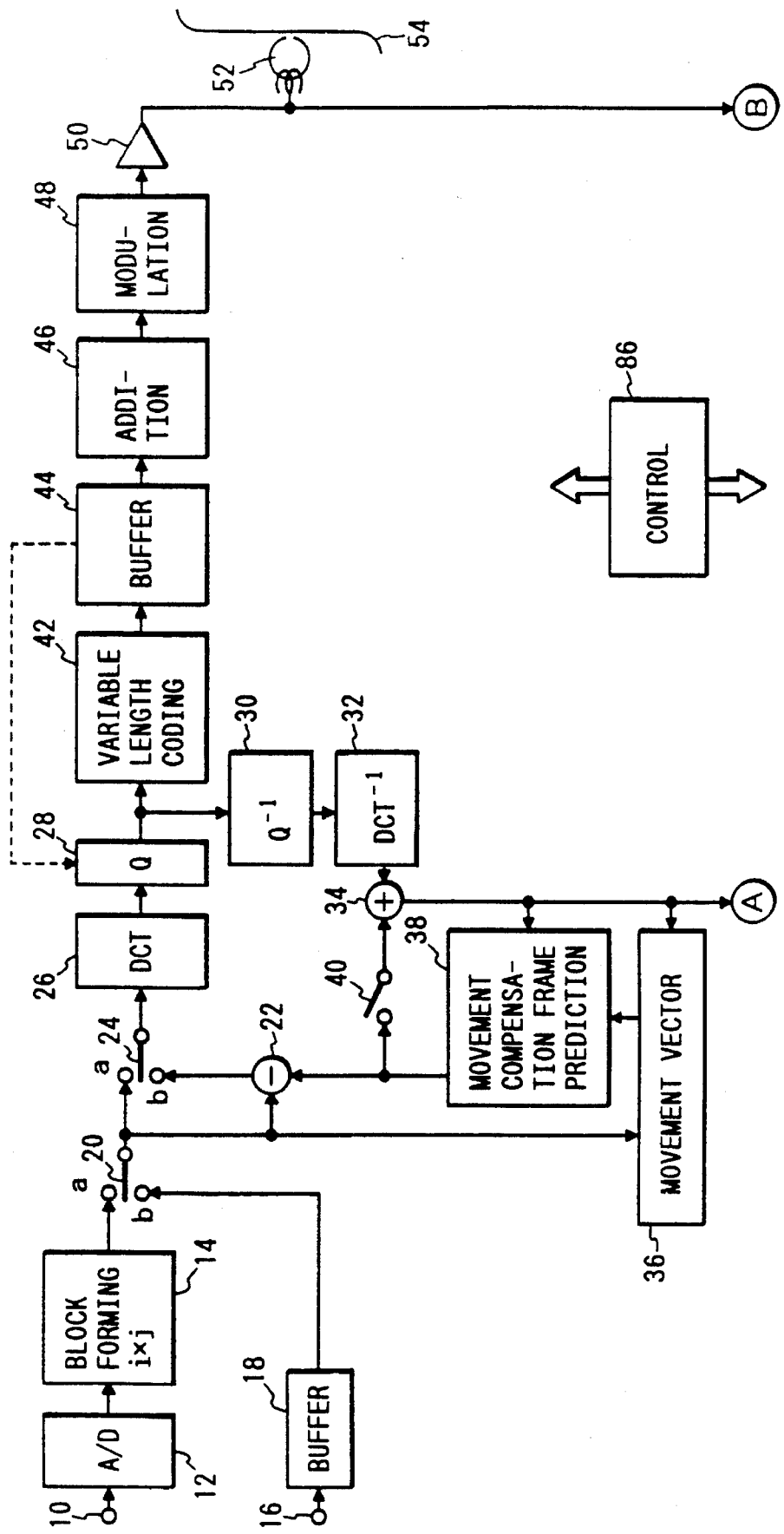
FIGS. 1A and 1B show a schematic constructional block diagram of an embodiment of the present invention.
Figure 1B:
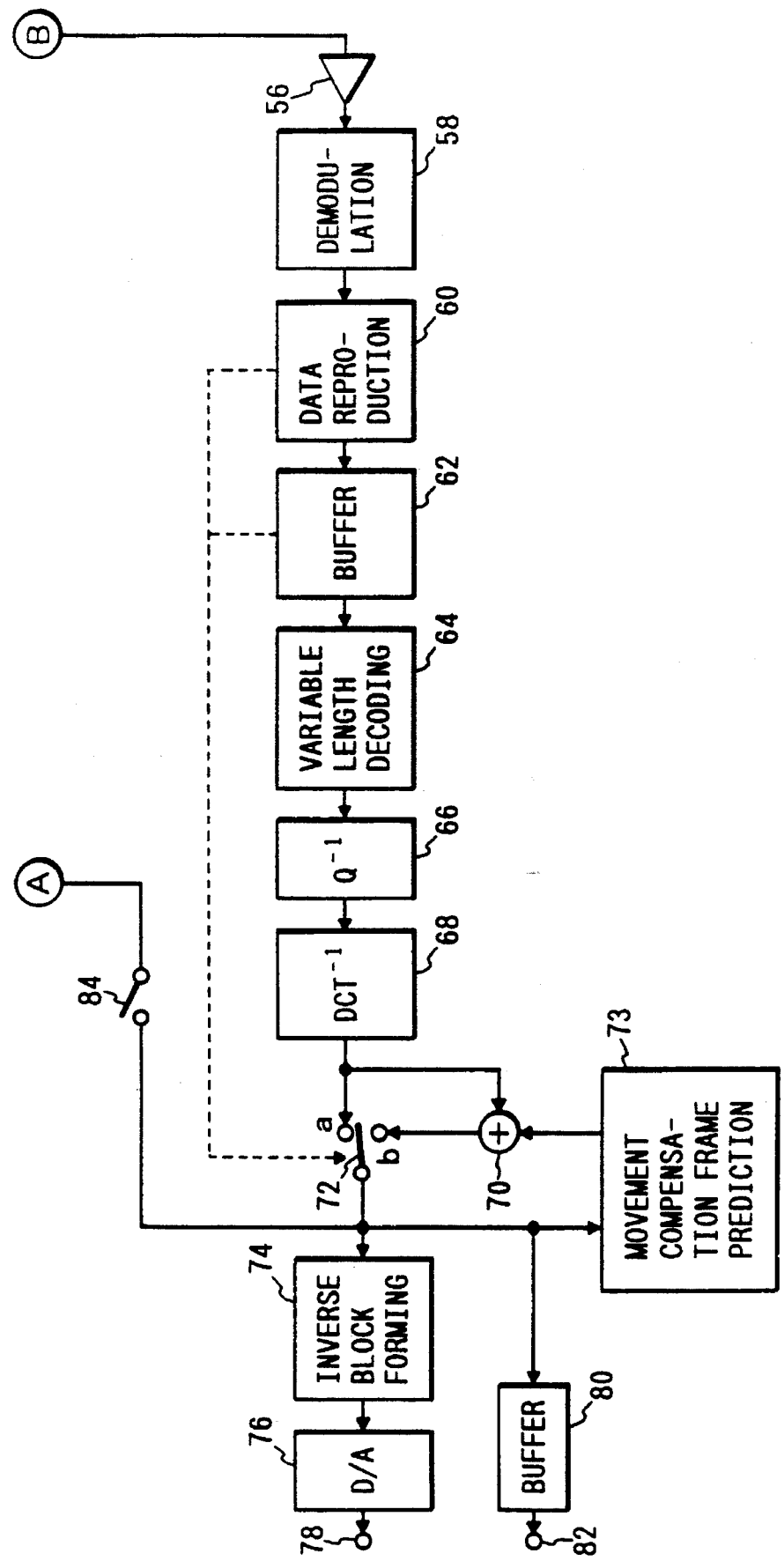

FIGS. 1A and 1B show a transmitting apparatus of an embodiment of the present invention. The embodiment relates to the case where the invention was applied to a digital VTR.

In FIGS. 1A and 1B, reference numeral 10 denotes an analog input terminal of a moving image signal to be recorded; 12 an A/D converter to convert the analog image signal from the input terminal 10 into the digital signal; 14 a block forming circuit to form blocks each comprising [(i) pixels in the horizontal direction x (j) pixels in the vertical direction] from the raster scan image data which is output from the A/D converter 12; 16 a digital input terminal of a moving image signal to be recorded; and 18 a buffer of the image data from the input terminal 16. It is now assumed that the image data which is supplied to the input terminal 16 has already been converted into the blocks. Reference numeral 20 denotes a switch to select an output of the block forming circuit 14 or an output of the buffer 18.

Reference numeral 22 denotes a subtractor to subtract a prediction value of an output of the switch 20; and 24 indicates a switch to select either one of the output (a contact) of the switch 20 and an output (b contact) of the subtractor 22. The switch 24 is connected to the (a) contact in case of the intra-frame coding and to the (b) contact in case of the inter-frame prediction coding.

Reference numeral 26 denotes a DCT (Discrete Cosine Transform) circuit to convert the data selected by the switch 24 into a frequency region by a discrete cosine transformation; and 28 a quantizing circuit to quantize an output (frequency coefficient) of the DCT circuit 26 by quantization steps of each frequency coefficient.

Reference numeral 30 denotes an inverse quantizing circuit for inverse quantizing an output of the quantizing circuit 28; 32 an inverse DCT circuit to convert an output of the inverse quantizing circuit 30 into a time base region; and 34 an adder for adding 0 to an output of the inverse DCT circuit 32 in case of the intra-frame coding and for adding the prediction value to the output of the inverse DCT circuit 32 in case of the inter-frame prediction coding. An output of the adder 34 becomes a local decoding value of the intra-frame coding or the inter-frame prediction coding.

Reference numeral 36 denotes a movement vector detecting circuit to detect a movement of an image between two picture planes (ordinarily, the present picture plane and the preceding picture plane); and 38 a movement compensation frame prediction circuit to movement-compensated an output of the adder 34. An output of the movement compensation frame prediction circuit 38 becomes a prediction value. Reference numeral 40 denotes a switch which is opened in case of the intra-frame coding and is closed in case of the inter-frame coding. The prediction value which is output from the movement compensation frame prediction circuit 38 is supplied to the subtractor 22 and is also supplied to the adder 34 through the switch 40.

Reference numeral 42 denotes a variable length coding circuit for variable length coding the output of the quantizing circuit 28; and 44 a buffer memory for buffering an output of the variable length coding circuit 42. Quantizing characteristics of the quantizing circuit 28 are controlled in accordance with a memory data amount of the buffer 44. Reference numeral 46 denotes an addition circuit for adding an error correction code, a synchronizing code Sync, an ID signal, and a discrimination signal to discriminate the intra-frame coding and the inter-frame coding. Reference numeral 48 denotes a modulation circuit for low frequency suppression modulating an output of the addition circuit 46; and 50 a recording amplifier to amplify an output of the modulation circuit 48 to a predetermined level.

Reference numeral 52 denotes a magnetic head for recording and reproduction; and 54 a magnetic tape as a recording medium.

Reference numeral 56 denotes a reproducing amplifier to amplify a reproduction output of the recording and reproducing head 52; 58 a demodulation circuit to demodulate an output of the reproducing amplifier 56; 60 a data reproduction circuit for reproducing the data in accordance with the sync code Sync and the ID signal and performs an error correction by the error correction code; 62 a buffer memory for buffering a reproduction data which is output from the data reproduction circuit 60; 64 a variable length decoding circuit for variable length decoding output data of the buffer 62; 66 an inverse quantizing circuit for inverse quantizing an output of the variable length decoding circuit 64; and 68 an inverse DCT circuit for inverse DCT converting an output of the inverse quantizing circuit 66.

Reference numeral 70 denotes an adder for adding a prediction value to an output of the inverse DCT circuit 68; and 72 a switch to select either one of an output (a contact) of the inverse DCT circuit 68 and an output (b contact) of the adder 70. In accordance with the coding discrimination signal detected by the data reproduction circuit 60, the switch 72 is connected to the (a) contact in case of the intra-frame coding and to the (b) contact in case of the inter-frame coding.

Reference numeral 73 denotes a movement compensation frame prediction circuit to calculate a movement compensation frame prediction value from the reproduction image data selected by the switch 68. Although the same circuit as the movement compensation frame prediction circuit 38 of the recording system is commonly used as a movement compensation frame prediction circuit 73, the circuit 73 is indicated by a different reference numeral for convenience of explanation of the recording and reproducing operations.

Reference numeral 74 denotes an inverse block forming circuit to return the reproduction image data selected by the switch 72 to the raster scan data; 76 a D/A converter for converting output data of the inverse block forming circuit 74 into the analog signal; 78 an analog reproduction image output terminal to generate an output of the D/A converter 76 to the outside; 80 a buffer for buffering the reproduction image data selected by the switch 72; and 82 a digital reproduction image output terminal to generate an output of the buffer 80 to the outside.

Reference numeral 84 denotes a switch for transferring the image data which is necessary for the inter-frame coding of the image to be inserted in the recorded image in case of the insertion recording to the movement compensation frame prediction circuit 38. Reference numeral 86 denotes a control circuit to control a whole apparatus, particularly, control the switching operations of the switches 20, 24, 40, and 84.

Figure 3:
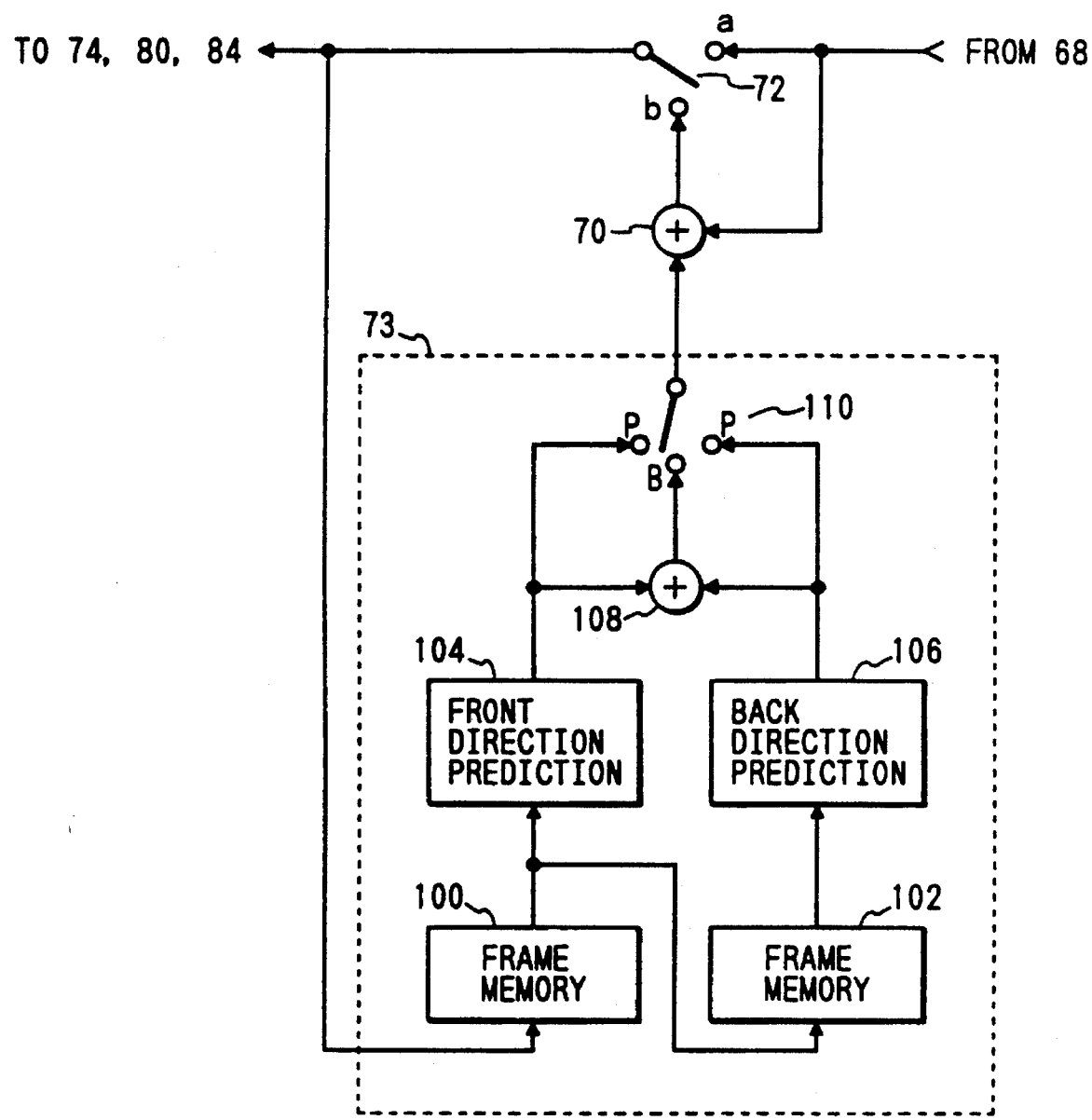
FIG. 3 is a schematic constructional block diagram of a movement compensation frame prediction circuit 73.

FIG. 2 shows a detailed circuit diagram of the movement compensation frame prediction circuit 38. FIG. 3 shows a detailed circuit diagram of the movement compensation frame prediction circuit 73. Each of the circuits 38 and 73 comprises: two frame memories 100 and 102 which are serially connected; a front direction prediction circuit 104; a back direction prediction circuit 106; an adder 108 to add an output of the front direction prediction circuit 104 and an output of the back direction prediction circuit 106; and a switch 110 for selecting either one of the outputs of the front direction prediction circuit 104, back direction prediction circuit 106, and adder 108.

As shown in FIG. 2, in the recording system, the movement vector detected by the movement vector detecting circuit 36 is supplied to the front direction prediction circuit 104 and back direction prediction circuit 106. The front and back direction prediction circuits 104 and 106 output prediction values which were movement-compensated with respect to the front and back directions, respectively.

The switching operation of the switch 110 is controlled by the control circuit 86 in accordance with a compression effect, a picture quality, a special reproducing function, or the like.

Figure 4:
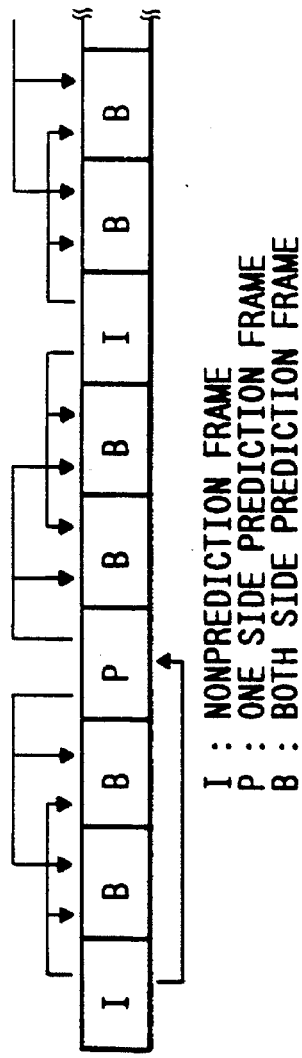
FIG. 4 is an explanatory diagram of a prediction direction.

FIG. 4 shows an example of the recording order of an intra-frame coding picture plane (hereinafter, called an I frame), a one-side prediction coding picture plane (hereinafter, called a P frame) using one future or past I frame as a reference picture plane, and a both-side prediction coding picture plane (hereinafter, called a B frame) in which a both-side prediction was performed by using the I and P frames as reference picture planes. Appearance frequencies and orders of the I, P, and B frames are adaptively adjusted in accordance with a compression ratio, a picture quality, or the like.

The ordinary recording and reproducing operations will be first described. In the ordinary recording and reproducing operations, the control circuit 86 turns off the switch 84.

In case of the analog input, the A/D converter 12 converts the analog image signal from the input terminal 10 into the digital signal. The block forming circuit 14 forms blocks from the output image data of the A/D converter 12. The switch 20 is connected to the (a) contact. In case of the digital input, the input image data of the input terminal 16 is supplied to the (b) contact of the switch 20 through the buffer 18. The switch 20 is connected to the (b) contact.

In case of the picture plane which is intra-frame coded, the control circuit 86 connects the switch 24 to the (a) contact and turns off the switch 40. Thus, the output (output of the block forming circuit 14 or output of the buffer 18) of the switch 20 is DCT-converted by the DCT circuit 26 and is quantized by the quantizing circuit 28.

The output of the quantizing circuit 28 is decoded by the inverse quantizing circuit 30 and the inverse DCT circuit 32. The decoded value passes through the adder 34 and is supplied to the movement vector detecting circuit 36 and the movement compensation frame prediction circuit 38. The movement vector detecting circuit 36 detects a movement vector of the image from the output of the adder 34 and the present image data from the switch 20 and supplies it to the movement compensation frame prediction circuit 38. In the movement compensation frame prediction circuit 38, the output of the adder 34 is sequentially stored into the frame memories 100 and 102 and generates a prediction value which was movement-compensated in accordance with the movement vector detected by the movement vector detecting circuit 36.

In case of the picture plane which is inter-frame coded, the control circuit 86 connects the switch 24 to the (b) contact and turns on the switch 40. The subtractor 22 subtracts the prediction value from the movement compensation frame prediction circuit 38 from the output of the switch 20 and generates a prediction error. The prediction error is supplied to the DCT circuit 26 through the switch 24 and is DCT-converted by the DCT circuit 26 and is quantized by the quantizing circuit 28.

The output of the quantizing circuit 28 is decoded by the inverse quantizing circuit 30 and the inverse DCT circuit 32. The adder 34 adds the prediction value to the output of the inverse DCT circuit 32. The output of the adder 34 is a local decoded value of the inter-frame coded data. The output of the adder 34 is supplied to the movement compensation frame prediction circuit 38 but is not stored into the frame memories 100 and 102.

The data which was intra-frame coded or was inter-frame coded as mentioned above is variable length coded by the variable length coding circuit 42. The output of the circuit 42 is supplied to the addition circuit 46 through the buffer 44 and is added with the error correction code, sync code Sync for synchronization block formation, ID signal for synchronization block discrimination, and coding discrimination signal and is generated as a sync block of a predetermined size. The coding discrimination signal is supplied from the control circuit 86.

The modulation circuit 48 low frequency suppression modulates the output of the addition circuit 46. The output of the modulation circuit 48 is supplied to the magnetic head 52 through the recording amplifier 50 and is recorded onto the magnetic tape 54.

In the ordinary reproducing mode, the recording signal of the magnetic tape 54 is reproduced by the magnetic head 52 and its head output is supplied to the demodulation circuit 58 through the reproducing amplifier 56 and is demodulated. The data reproduction circuit 60 detects the ID, compression data, error correction code, and coding discrimination signal from the output of the demodulation circuit 58 by the sync code Sync and corrects a recording and reproduction error by the error correction code. The switching operation of the switch 72 is controlled by the detected coding discrimination signal.

The output (reproduction data) of the data reproducing circuit 60 is supplied to the variable length decoding circuit 64 through the buffer 62. The variable length decoding circuit 64 decodes the variable length code portion in the compression data and its output is inverse-quantized by the inverse quantizing circuit 66 and is inverse DCT converted by the inverse DCT circuit 68.

The adder 70 adds the prediction value to the output of the inverse DCT circuit 68. The output of the inverse DCT circuit 68 is supplied to the (a) contact of the switch 72. The output of the adder 70 is supplied to the (b) contact of the switch 72. Under control of the data reproduction circuit 60, the switch 72 is connected to the (a) contact for the intra-frame coding frame and to the (b) contact for the inter-frame coding frame. Therefore, the output of the switch 72 becomes reproduction image data in which the intra-frame coding data and the inter-frame coding data were respectively properly decoding-processed.

The movement compensation frame prediction circuit 73 generates a prediction value of the movement compensation frame prediction from the output of the switch 72 in a manner similar to the movement compensation frame prediction circuit 38.

The inverse block forming circuit 74 returns the output of the switch 72 to the raster scan output. The output of the inverse block forming circuit 74 is converted into the analog signal by the D/A converter 76 and is output from the analog output terminal 78 to the outside. The output of the switch 72 is also rate-adjusted adjusted by the buffer memory 76 and is output from the digital output terminal 82 to the outside.

The operation of the insertion recording (joint recording) for recording so as to join a new video image from the halfway of the existing recorded video image will now be described with reference to FIGS. 5A to 5E. It is now assumed that the image to be inserted is input from the input terminal 10 or 16. For simplicity of explanation, however, it is assumed that the inter-frame prediction coding picture plane is only the B frame using the past and future intra-frame coding picture planes (I frames) as reference picture planes. The coding data of the intra-frame coding picture plane is shown by adding (i) after the frame number. The coding data of the inter-frame coding picture plane is shown by adding b(k1, k2) after the frame number. k1 and k2 denote frame numbers of the reference picture planes.

FIG. 5A shows a prediction relation between the inputting order (or reproducing order) of a video image signal to be insertion-edited and the inter-frame coding. FIG. 5B shows a recording order (coding order). FIG. 5A corresponds to the output of the switch 20. FIG. 5C shows an inputting order of a video image signal to be inserted. FIG. 5D shows a prediction relation and a coding method according to the embodiment of a video image signal to be inserted. FIG. 5E shows a recording order (coding order) after completion of the insertion.

It is now assumed that images of the frame #50 and subsequent frames shown in FIG. 5C are insertion-recorded after the frame #3. In this case, since the frame #3 has been both-side inter-frame coded by using the frames #1 and #4 as reference frames, coding data I4 of the frame #4 cannot be erased.

In the embodiment, therefore, compression data 4i of the frame #4 which is necessary for decoding of the frame #3 is left and the recording of the images to be inserted (frame #50 and subsequent frames) is started from the position at which the intra-frame coding picture plane should be arranged after data 3b(0, 4).

In case of the images to be inserted (frame #50 and subsequent frames) as they are, the frames #50 and #54 become the I frames and the frames #51, #52, and #53 become the B frames using the frames #50 and #54 as reference frames. However, in order to maintain the period of the I frame, in the embodiment, in place of the frame #50, the frame #2 is used as reference frames of the frames #51, #52, and #53.

In the process for retrieving the recording start point of the insertion recording, the switch 84 has been turned on and the reproduction data of the I frame (in the embodiment, frame #4) just after the insertion point of the existing record is transferred to the movement compensation inter-frame prediction circuit 38 of the recording system. Thus, the frame #2 can be used as a reference frame at the time of the inter-frame prediction coding of the frames #51, #52, and #53 of the images to be inserted.

In case of commonly using the movement compensation inter-frame prediction circuit 38 of the recording system and the movement compensation inter-frame prediction circuit 73 of the reproducing system, when the insertion recording is executed, it is sufficient to preserve the memory contents in the frame memories 100 and 102.

In the embodiment, therefore, the frames #51, #52, and #53 are inter-frame prediction coded by using the frames #4 and #5 as reference frames. After completion of the insertion recording, the recording order of the coding data on the magnetic tape 54 is as shown in FIG. 5E.

By recording as mentioned above, not only the arrangement rules of the intra-frame coding and the inter-frame coding are maintained at time points before and after the insertion but also the relation of the reference frames of the inter-frame prediction is maintained, so that the reproducing operation can be simplified and a burden on the reproducing process is reduced.

By recording as shown in FIG. 5E, as a reproduction output order, the frame #51 and subsequent frames are reproduced and output after the frames #1, #2, #3, and #4. Namely, this equivalents to that the frames #52 and subsequent frames were insertion recorded after the frame #4. However, a deviation of one frame doesn't cause a large problem.

Figure 6:
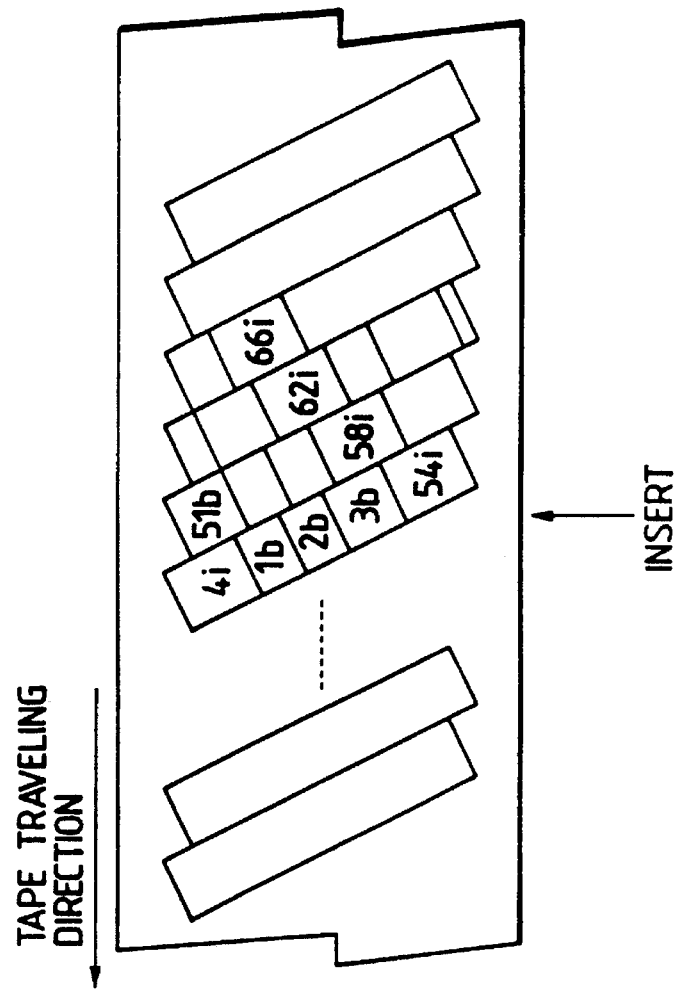
FIG. 6 is an example of a data arrangement on recording track patterns corresponding to FIGS. 5A to 5E.

FIG. 6 shows an example of recording track patterns according to the embodiment.

An embodiment in which the I frame after the insertion point of the recorded image is preserved and the first frame of an image to be inserted is deleted will now be described. FIG. 7A shows a prediction relation between the inputting order (or reproducing order) of the video image signal to be insertion-edited and the inter-frame coding. FIG. 7B shows a recording order (coding order). FIG. 7C shows an inputting order of the video image signal to be inserted. FIG. 7D shows a prediction relation and a coding method according to the embodiment of the video image signal to be inserted. FIG. 7E shows a recording order (coding order) after completion of the insertion. FIG. 7F shows a reproduction picture plane order of the recorded image after completion of the insertion.

It is now assumed that the frame #50 and subsequent frames are inserted just before the frame #3. In this case, although the frames #3 and #4 are unnecessary, since the frame #2 has already been both-side inter-frame coded by using the frames #1 and #4 as reference frames, the coding data 4i of the frame #4 cannot be erased.

Therefore, in the embodiment, the compression data 4i of the frame #4 which is necessary for decoding of the frame #2 is left and data 3b(0, 4) is also left in order to maintain the regularity. An insertion flag indicative of the actual insertion point is recorded after the data 4i and the images (frame #50 and subsequent frames) to be inserted are recorded after the data 3b(0, 4). For the images (frame #50 and subsequent frames) to be inserted, the frame #4 is set to the first picture plane and the frames are subsequently sequentially coded in accordance with a predetermined order. That is, the frames #50, #51, and #52 are inter-frame coded by using the frames #4 and #53 as reference frames.

In a manner similar to the case of FIGS. 5A to 5E, for the process to retrieve the recording start point of the insertion recording, the switch 84 has already been turned on and the reproduction data of the I frame (frame #4 in the embodiment) just after the insertion point of the existing record is transferred to the movement compensation inter-frame prediction circuit 38 of the recording system. Due to this, the frame #2 can be set to the reference frame at the time of the inter-frame prediction coding of the frames #50, #51, and #52 of the image to be inserted.

In the case where the movement compensation inter-frame prediction circuit 38 of the recording system and the movement compensation inter-frame prediction circuit 73 of the reproducing system are commonly used, when the insertion recording is executed, it is sufficient to preserve the memory contents in the frame memories 100 and 102.

After completion of the insertion recording, the recording order of the coding data on the magnetic tape 54 is as shown in FIG. 7E. When the coding data is reproduced, the frame #3 is read-skipped by the insertion flag and the frames #4, #50, . . . continue after the frame #2.

In FIGS. 7A to 7F as well, not only the arrangement rules of the intra-frame coding and the inter-frame coding are maintained at time points before and after the insertion but also the relation of the reference frames of the inter-frame prediction is maintained, so that the reproducing operation can be simplified and the burden on the reproducing process is reduced.

Figure 8:
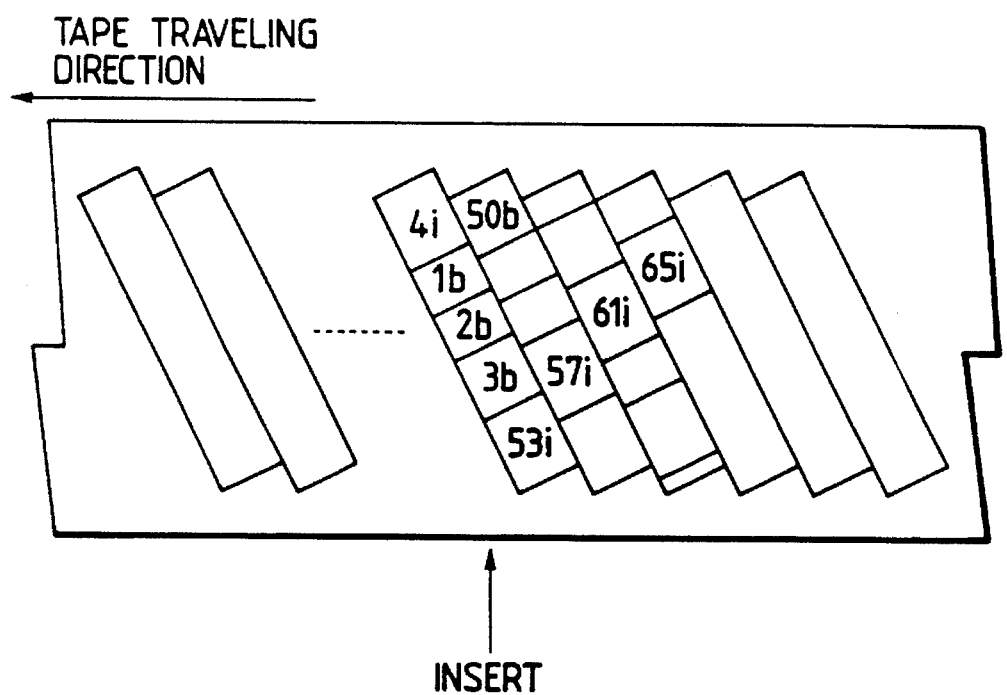
FIG. 8 is an example of a data arrangement on recording track patterns corresponding to FIGS. 7A to 7F.

FIG. 8 shows an example of recording track patterns for FIGS. 7A to 7F.

An embodiment in which the frame after the I frame before the insertion point is deleted for the recorded image will now be described. FIG. 9A shows a prediction relation between the inputting order (or reproducing order) of the video image signal to be insertion-edited and the inter-frame coding. FIG. 9B shows a recording order (coding order). FIG. 9C shows an inputting order of the video image signal to be inserted. FIG. 9D shows a prediction relation and a coding method according to the embodiment of the video image signal to be inserted. FIG. 9E shows a recording order (coding order) after completion of the insertion.

It is now assumed that the frame #50 and subsequent frames shown in FIG. 7C are inserted just before the frame #8 as an I frame. In the embodiment, the frames for a time interval from a time point of the insertion point until a time point just before the first I frame (frame #4 in FIGS. 9A to 9E) are deleted. That is, the frames #5, #6, and #7 are deleted. Further, a few first frames of the images (frame #50 and subsequent frames) to be inserted are inter-frame coded by using the past first I frame from the insertion point as a reference frame.

In a manner similar to the case of FIGS. 5A to 5E, for the process to retrieve the recording start point of the insertion recording, the switch 84 has already been turned on and the reproduction data of the I frame (frame #4 in the embodiment) just before the insertion point of the existing record is transferred to the movement compensation inter-frame prediction circuit 38 of the recording system and is preserved. Thus, the frame #4 can be set to the reference frame at the time of the inter-frame prediction coding of the frames #50, #51, and #52 of the images to be inserted.

In the case where the movement compensation inter-frame prediction circuit 38 of the recording system and the movement compensation inter-frame prediction circuit 73 of the reproducing system are commonly used, when the insertion recording is performed, it is sufficient to preserve the memory contents in the frame memories 100 and 102.

After completion of the insertion recording, the recording order of the coding data on the magnetic tape 54 is as shown in FIG. 9E. When the coding data is reproduced, the frame #50 and subsequent frames are reproduced after the frame #4. Namely, this equivalents to that the frame #50 and subsequent frames are joined after the frame #4.

In FIGS. 9A to 9E, not only the arrangement rules of the intra-frame coding and the inter-frame coding are maintained at time points before and after the insertion but also the relation of the reference frames of the inter-frame prediction is maintained, so that the reproducing operation can be simplified and the burden on the reproducing process is reduced.

Figure 10:
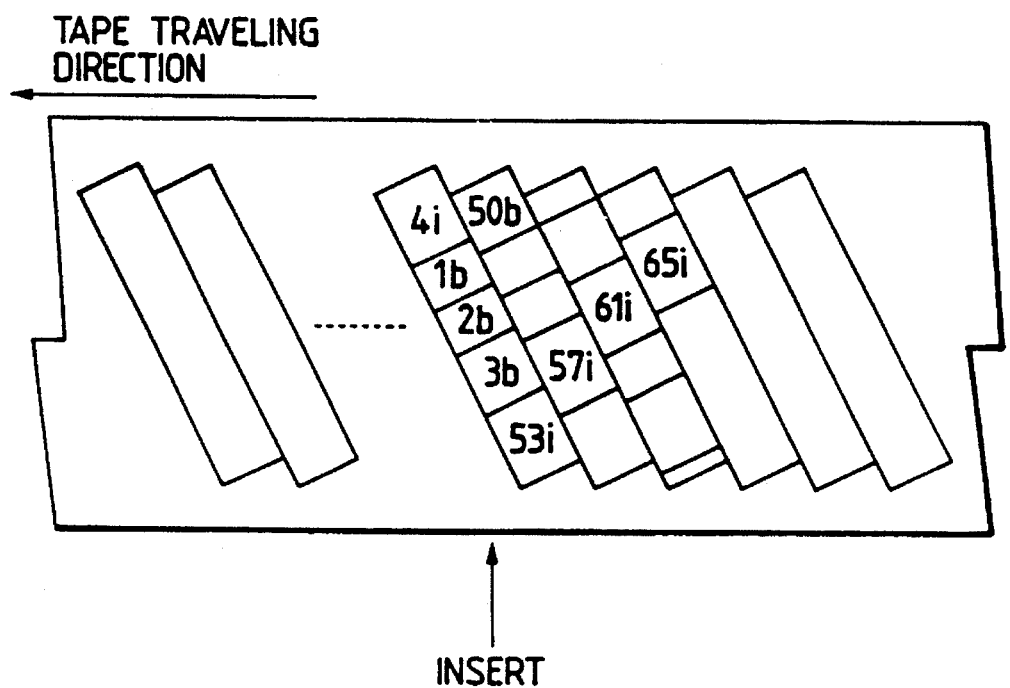
FIG. 10 is an example of a data arrangement on recording track patterns corresponding to FIGS. 9A to 9E.

FIG. 10 shows an example of recording track patterns for FIGS. 9A to 9E.

In the above description, the frame has been set to a coding unit. However, it is also possible to use a compression method in which the intra-field coding and the inter-field coding are commonly used by setting the field to a coding unit. The arrangement period of the intra-frame (or intra-field) coding picture plane is not limited to that shown in the above example. The arrangement and the like of the both-side prediction and one-side prediction are also not limited to those shown in the above example. Compression methods other than the combination of the DCT and the variable length coding can be also obviously applied to the invention.

In the case where the image data to be insertion-recorded has been coded and recorded on the recording medium in a manner similar to the image data to be insertion-edited, it will be obviously understood that it is preferable that the data portion which is unnecessary to change the reference frames or the like is transferred and recorded in a compressed state.

Although the invention has been described with respect to the case where the magnetic tape is used as a recording medium as an example, the cases of using other recording media such as magnetic disk, optical disk, magneto-optic disk, solid-state memory, and the like are also incorporated in the range of the present invention.

Although the above embodiments have been described with respect to the case where the invention was applied to the VTR, the transmitting apparatus of the invention can be also obviously applied to the case of inserting another channel data to a certain channel data.

As will be obviously understood from the above description, according to the embodiments, in the transmitting apparatus using the compression method using both of the intra-frame coding and the inter-frame coding, a consistency of the reproducing operation can be maintained at time points before and after the insertion of another image. Consequently, for example, in the VTR or the like, a reproducing operation can be easily performed and the apparatus can easily correspond to the joint recording, edition, special reproduction, or the like.

What is claimed is:

1. A recording apparatus for recording additional information to be inserted starting at a designated insertion point position of an existing record of recorded information, said apparatus being for use in a recording system for (i) compressing a series of information signals by a non-prediction coding and a prediction coding which uses non-prediction coding information as reference coding information and (ii) recording prediction coding information and the non-prediction coding information onto a recording medium in accordance with a predetermined order, said apparatus comprising:

means for retaining (i) a non-prediction coding information after the insertion point position in the existing record of recorded information and (ii) information prior to the non-prediction coding information in the existing record; and means for prediction coding a leading predetermined quantity of information in the additional information to be inserted by using, as reference coding information, the non-prediction coding information after the insertion point position of the recorded information.

2. An apparatus according to claim 1, further comprising means for recording information regarding the insertion point position at a predetermined position of existing record of recorded information.

3. A recording apparatus for recording additional information to be inserted starting at a designated insertion point position of an existing record of recorded information, said apparatus being for use in a recording system for (i) compressing a series of information signals by a non-prediction coding and a prediction coding which uses non-prediction coding information as reference coding information and (ii) recording prediction coding information and the non-prediction coding information onto a recording medium in accordance with a predetermined order, said apparatus comprising:

means for erasing prior prediction coding information, which information uses a non-prediction coding information after the insertion point position as reference coding information, in the existing record of recorded information; and means for prediction coding a leading predetermined quantity of information in the additional information to be inserted by using, as reference coding information, the non-prediction coding information before the insertion point position in the existing record of recorded information.

4. An inserting/transmitting apparatus for inserting additional information to be inserted starting at a designated insertion point position of information of one channel and for transmitting, said apparatus being for use in a transmitting system for (i) compressing a series of information signals by a non-prediction coding and a prediction coding which uses non-prediction coding information as reference coding information and (ii) transmitting prediction coding information and the non-prediction coding information in accordance with a predetermined order, said apparatus comprising:

means for retaining (i) a non-prediction coding information after the insertion point position and (ii) information prior to the non-prediction coding informationa; and means for prediction coding a leading predetermined quantity of information in the additional information to be inserted by using, as reference coding information, the non-prediction coding information after the insertion point position.

5. An apparatus according to claim 4, wherein the information of the one channel comprises information recorded in a recording medium.

6. An apparatus according to claim 5, wherein the recording medium comprises a magnetic tape.

7. An apparatus according to claim 5, wherein the recording medium comprises an optical disk.

8. A transmission apparatus for transmitting moving image data, comprising:

first input means for inputting first moving image data which is coded;

second input means for inputting second moving image data;

synthesizing means for synthesizing the first moving image data and the second moving image data;

encoding means for encoding moving image data synthesized by said synthesizing means, by using a prediction encoding method, said encoding means prediction-encoding a predetermined picture of said second moving image data by using a predetermined picture of said first moving image data as a reference picture; and output means for outputting the moving image data encoded by said encoding means.

9. Apparatus according to claim 8, wherein said output means includes a video tape recorder for recording the encoded moving image data on a recorded medium.

10. Apparatus according to claim 8, wherein said encoding means performs encoding based on the MPEG method.

11. Apparatus according to claim 8, wherein said first moving image data is data reproduced from a recording medium.

* * * * *

UNITED STATES PATENT AND TRADEMARK OFFICE
CERTIFICATE OF CORRECTION

PATENT NO. :     5,521,898       Page 1 of 2
DATED       :     May 28, 1996
INVENTOR(S) :    YOSHIMI OGASAWARA It is certified that error appears in the above-indentified patent and that said Letters Patent is hereby corrected as shown below:

Title page, item
[56] FOREIGN PATENT DOCUMENTS

"2285816" should read --2-285816--;
   "4239280" should read --4-239280--;
   "5176297" should read --5-176297--; and
   "5176296" should read --5-176297--.

[56] U.S. PATENT DOCUMENTS

Insert --5,191,436 3/93 Yonemitsu ... 358/335--; and
   --5,175,618 12/92 Ueda, et al. ... 358/136--.

[57] ABSTRACT, line 10,

"than" should read --other than--.

Column 1

Line 28, "perform the" should read --perform--; and
   Line 34, delete "plane".

Column 2

Line 9, "than" should read --other than--; and
   Line 28, "prediction-coded" should read --prediction
         coded--.
   Line 64, "EMBODIMENT" should read-- EMBODIMENTS--.

Column 3

Line 46, "movement-compensated" should read
         --movement-compensate--.

UNITED STATES PATENT AND TRADEMARK OFFICE
CERTIFICATE OF CORRECTION

PATENT NO. : 5,521,898 Page 2 of 2
DATED : May 28, 1996
INVENTOR(S) : YOSHIMI OGASAWARA It is certified that error appears in the above-indentified patent and that said Letters Patent is hereby corrected as shown below:

<u>Column 6</u>

Line 60, "adjusted" should be deleted.

<u>Column 11</u>

Line 27, "informationa;" should read --information;--.

<u>Column 12</u>

Line 24, "Apparatus" should read --An apparatus--;
Line 27, "Apparatus" should read --An apparatus--; and
Line 29, "Apparatus" should read --An apparatus--.

Signed and Sealed this

Twenty-fourth Day of September, 1996

*Attest:*

BRUCE LEHMAN

*Attesting Officer*     *Commissioner of Patents and Trademarks*